United States Patent [19]
Dougherty et al.

[11] Patent Number: 5,582,792
[45] Date of Patent: Dec. 10, 1996

[54] CORROSION INHIBITION BY ETHOXYLATED FATTY AMINE SALTS OF MALEATED UNSATURATED ACIDS

[75] Inventors: James A. Dougherty, Manchester; Benjie T. Outlaw; Bernardus A. Oude Alink, both of St. Louis, all of Mo.

[73] Assignee: Petrolite Corporation, St. Louis, Mo.

[21] Appl. No.: 518,696

[22] Filed: Aug. 24, 1995

[51] Int. Cl.$^6$ ................................................ C23C 22/48
[52] U.S. Cl. ................................ 422/16; 422/14; 422/17; 106/14.41; 427/388.1
[58] Field of Search .................... 422/12, 13, 14, 422/16, 17; 148/248; 427/388.1; 106/14.41

[56] References Cited

U.S. PATENT DOCUMENTS

| | | | |
|---|---|---|---|
| 2,343,644 | 3/1944 | Cawley | 260/405.6 |
| 2,756,210 | 7/1956 | Raifsnider | 252/8.55 |
| 3,162,658 | 12/1964 | Baltes et al. | 260/405.6 |
| 3,753,968 | 8/1973 | Ward | 260/97.6 |
| 3,985,504 | 10/1976 | Kindscher et al. | 21/2.7 R |
| 4,156,095 | 5/1979 | Jevne et al. | 562/509 |
| 4,547,224 | 10/1985 | Schilling | 106/273 |
| 4,560,497 | 12/1985 | Staker et al. | 252/392 |
| 4,658,036 | 4/1987 | Schilling | 548/513 |
| 4,676,927 | 6/1987 | Schilling et al. | 252/311.5 |
| 4,861,377 | 8/1989 | Schilling | 106/277 |
| 4,927,669 | 5/1990 | Knox et al. | 427/239 |
| 5,085,702 | 2/1992 | Schilling et al. | 106/277 |
| 5,167,694 | 12/1992 | Robinson | 71/92 |
| 5,174,913 | 12/1992 | Alford et al. | 252/8.555 |
| 5,194,640 | 3/1993 | Cosgrove et al. | 554/126 |
| 5,292,480 | 3/1994 | Fischer et al. | 422/12 |
| 5,385,616 | 1/1995 | Dougherty et al. | 148/248 |

FOREIGN PATENT DOCUMENTS

| | | | |
|---|---|---|---|
| 2251634 | 11/1974 | France | C23F 11/10 |
| 2281438 | 11/1974 | France | C23F 11/10 |
| 2692283 | 6/1993 | France | C23F 11/12 |
| 3921607 | 1/1990 | Germany | C23F 11/10 |

OTHER PUBLICATIONS

Cowan, J. C., "Polymerication, Copolymerization, and Isomerization", *The Journal of the American Oil Chemists'Society*, vol. 31, Nov. 1954, pp. 529–535.

Anonymous, "Amino/amido/imidazoline compositions as oil and gas field corrosion inhibitors", *Research Disclosure*, Nov. 1994, p. 660.

*Primary Examiner*—Timothy McMahon
*Attorney, Agent, or Firm*—Kenneth Solomon

[57] ABSTRACT

A method for inhibiting corrosion of a metal surface bearing a corrosion product including ferrous ions is disclosed. The method comprises applying to the surface a salt of an ethoxylated amine and a reaction product of an alcohol and a fatty acid maleic anhydride adduct produced by a reaction between maleic anhydride and an unsaturated fatty acid. Related compositions are also disclosed.

23 Claims, No Drawings

5,582,792

CORROSION INHIBITION BY ETHOXYLATED FATTY AMINE SALTS OF MALEATED UNSATURATED ACIDS

BACKGROUND OF THE INVENTION

1. Field of the Invention

The present invention relates to corrosion inhibition and more particularly to inhibition of corrosion of metal surfaces by means of a corrosion inhibitive iron carboxylate coating formed over the surface.

2. Description of Prior Art

Corrosion of metal surfaces, especially corrosion of ferrous metal surfaces, in various media has long been a troublesome problem. Such surfaces are subjected or exposed to corrosive media in a wide variety of environments. One particularly conspicuous environment prone to corrosion may be found in oil and gas wells and fields, where carbon dioxide and sulfide corrosion of ferrous metal surfaces in oil and gas wells and pipelines is especially troublesome.

One response to such corrosion problems has been the use of corrosion inhibitors that coat corrosion-prone surfaces with a film or coating. The film forms a barrier between the metal surface and the corrosive medium.

In many situations, however, conventional films have not been found to provide completely satisfactory corrosion inhibition. An especially troublesome environment has been found to be those in which the inhibitor coating is subjected to significant shear forces, such as result from high flow rates of the medium across or at the coated metal, typically ferrous metal, surface. For example, many oil wells have been producing at increasing production rates, thereby increasing the shear stress applied to the pipe walls. These shear stresses tend to wear or strip away coatings of corrosion inhibitors from the metal surface.

Another problem with conventional film-type corrosion inhibitors is that they typically are not uniformly effective in a wide variety of media. Thus, while the efficacy of some inhibitors have been found to be acceptable in water-rich media, the efficacy of such inhibitors in inhibiting corrosion has been found to be less adequate in hydrocarbon-rich media. Likewise, inhibitors useful in hydrocarbon media have been found to be less so in aqueous media. However, such inhibitors are not as effective as desired even in the medium to which they are more suited, and more effective corrosion inhibition and more persistent inhibition in both types of media and other media is desired.

As a result, compositions and techniques that form films that provide highly effective corrosion inhibition and cling more tenaciously to the metal surface, thereby to be more resistant to shear forces, are still being sought. The need for such compositions and techniques is especially significant with respect to the particularly serious corrosion problems associated with ferrous metal surfaces such as iron and steel surfaces, and with respect to corrosion caused by exposure of such surfaces to carbon dioxide and sulfides. It is also desired that such compositions and techniques be adaptable to the wide variety of media, allowing optimization for each medium, while maintaining formulatability of the inhibitor composition in an inhibitor product including in the composition and a solvent.

U.S. Pat. No. 5,385,616 discloses that certain maleated unsaturated acids react with ferrous ions in corrosion product on a metal surface to form an iron carboxylate film that adheres tenaciously to the surface, thereby affording excellent corrosion protection. However, the maleated unsaturated acids of the noted patent are of limited use in certain respects. They are generally coordinated with the medium so as not to be soluble therein, thereby to avoid breakdown of the surface film by dissolution of the film into the medium. Indeed, soluble inhibitors generally do not maintain tenacious films or even substantial corrosion resistivity, particularly when the dissolved component is removed or lost as a result of fresh flow of medium over the surface.

Therefore, if the medium is water, a water insoluble/ hydrocarbon soluble inhibitor may be selected, while a water soluble/hydrocarbon insoluble inhibitor may be selected for a hydrocarbon medium. Because they are generally insoluble in the medium, they are usually applied to the surface itself, such as by painting, spraying or dipping techniques, rather than applied to the medium in which the metal surface is located.

Nevertheless, in many cases, it is difficult to design an inhibitor that is insoluble in the medium. For example, some media (such as produced fluids from wells) contain significant concentrations of both hydrocarbons and water. Moreover, it is often desirable to be able simply to add the inhibitor to the medium itself, such as by injection. Thus, selection of an insoluble corrosion inhibitor, although beneficial for film adherence, is often undesirable for convenient application. Accordingly, it is still desirable to locate corrosion inhibitors of this type that are soluble in the medium itself so that they may be applied to the medium itself, yet still maintains a tenacious film over the surface in the medium, even when the medium contains little or no dissolved inhibitor.

SUMMARY OF THE INVENTION

The present invention, therefore, is directed to a novel method for inhibiting corrosion in a liquid containing water and hydrocarbon of a metal surface that is susceptible to formation of ferrous ions upon corrosion. The method comprises applying to the liquid in an amount sufficient to inhibit corrosion a corrosion inhibitor comprising the reaction product of an ethoxylated amine and a dicarboxylic ester selected from the group consisting of

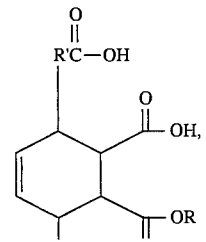

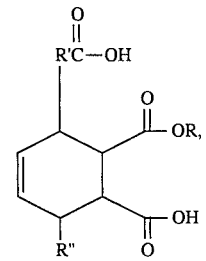

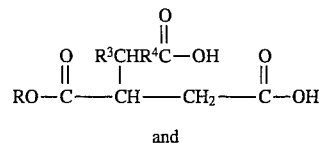

and

-continued $$HO-\overset{O}{\overset{\|}{C}}-CH(\overset{R^3CHR^4\overset{O}{\overset{\|}{C}}-OH}{|})-CH_2-\overset{O}{\overset{\|}{C}}-OR,$$

wherein R is hydrogen or an alkyl, aryl, aralkyl or alkaryl group of from about one to about twenty carbons, R' is a linear organic moiety of from about two to about 20 carbon atoms and R" is hydrogen or a linear organic moiety of up to about 20 carbon atoms, the total number of carbon atoms in R' and R" being from about 10 to about 20 carbon atoms, $R^3$ is an alkyl or alkenyl group of from about two to about fifteen carbons and $R^4$ is an alkylene or alkenylene group of from about two to about fifteen carbons.

In another aspect, the present invention is directed to a novel method for inhibiting corrosion of a metal surface in a liquid containing water and hydrocarbon, the metal surface being susceptible to formation of ferrous ions upon corrosion, in which the method comprises applying to the liquid a corrosion inhibitive amount of a salt of an ethoxylated amine and a reaction product of an alcohol and a fatty acid maleic anhydride adduct selected from the group consisting of

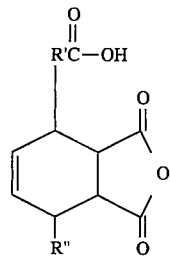

and

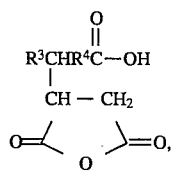

wherein R' is a linear organic moiety of from about two to about 20 carbon atoms and R" is hydrogen or a linear organic moiety of up to about 20 carbon atoms, the total number of carbon atoms in R' and R" being from about 10 to about 20 carbon atoms.

The present invention is also directed to a composition comprising the reaction product of an ethoxylated amine and a dicarboxylic ester selected from the group consisting of

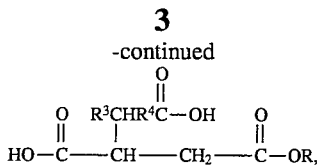

-continued

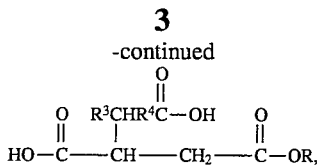

$$RO-\overset{O}{\overset{\|}{C}}-CH(\overset{R^3CHR^4\overset{O}{\overset{\|}{C}}-OH}{|})-CH_2-\overset{O}{\overset{\|}{C}}-OH$$

and $$HO-\overset{O}{\overset{\|}{C}}-CH(\overset{R^3CHR^4\overset{O}{\overset{\|}{C}}-OH}{|})-CH_2-\overset{O}{\overset{\|}{C}}-OR,$$

wherein R is hydrogen or an alkyl, aryl, aralkyl or alkaryl group of from about one to about twenty carbons, R' is a linear organic moiety of from about two to about 20 carbon atoms and R" is hydrogen or a linear organic moiety of up to about 20 carbon atoms, the total number of carbon atoms in R' and R" being from about 10 to about 20 carbon atoms, $R^3$ is an alkyl or alkenyl group of from about two to about fifteen carbons and $R^4$ is an alkylene or alkenylene group of from about two to about fifteen carbons.

Among the several advantages of this invention, may be noted the provision of a method for inhibiting corrosion of ferrous ion-bearing metal surfaces in a liquid medium by application of a film-type inhibitor that affords better persistence against shear forces than do other inhibitors; the provision of such method which enables customization of the film to the liquid medium to which the surface is otherwise exposed, thereby permitting optimization of the film; the provision of such method in which the inhibitor is soluble in the liquid medium, yet forms the tenacious film over the surface; the provision of such method which allows application of the film by injection of the inhibitor into the liquid medium; and the provision of a corrosion inhibitor useful in such method.

DETAILED DESCRIPTION OF THE PREFERRED EMBODIMENTS

In accordance with the present invention, it has been discovered that if a reaction product of an ethoxylated amine and a maleated unsaturated fatty acid is injected into a liquid comprising hydrocarbon and water and containing therein a ferrous metal surface, a coating is formed over the ferrous metal surface, and that the coating thus-formed affords highly effective corrosion inhibition and surprisingly high resistance to shear forces, despite the solubility of the product in the liquid. Moreover, the ethoxylated amine, and especially the degree of ethoxylation of the ethoxylated amine, may be selected for coordination with the fluid medium to which the coated metal surface is exposed, permitting customization of the solubility of the reaction product to the medium, and further coordination with the solvent to be used in the corrosion inhibitor product.

These inhibitors, which are believed to be novel, therefore have the ability to be coordinated to the medium and to enable the formation of tenaciously adherent coatings with inhibitors designed specifically for solubility in the medium. This is in sharp contrast to the inhibitors of U.S. Pat. No. 5,385,616, in which inhibitor insolubility is desired for the formation of especially high persistence coatings in the media. The new customized coatings have been found to be more persistent than prior art films despite the solubility of the inhibitor in the medium. Thus, by preparing reaction products that are soluble in the medium, inhibitors that may be applied by simple injection or dispersion into the medium, yet form coatings of high persistence and resistance to shear forces have been prepared.

The maleated unsaturated fatty acid reactant may be prepared from maleic anhydride and any unsaturated fatty acid according to the method described in U.S. Pat. No. 5,385,616 for what is identified therein as a fatty acid maleic anhydride adduct. As noted therein, preparation of preferred adducts have been described previously; for example, in U.S. Pat. Nos. 4,658,036 and 4,927,669, which are incorporated herein by reference. The unsaturated fatty acid may be mono-, di- or poly-unsaturated. Tall oil fatty acids have been found to be especially useful and the most preferred fatty acid is conjugated linoleic acid, but unconjugated linoleic acid and other unsaturated, fatty carboxylic acids are suitable. Of these other acids, it is preferred that they be at least di-unsaturated and, optimally, conjugated. It is also preferred that the acid have from about fourteen to about 22 carbon atoms, especially from about sixteen to about eighteen carbon atoms. Such acids may be represented by the idealized formula $R*C(:O)OH$, wherein $R*$ is an unsaturated aryl, arylalkenyl, arylalkyl, alkylaryl, alkenylaryl or, optimally, alkenyl group, preferably at least di-unsaturated, of from about thirteen to about 21 carbons, preferably from about fifteen to about seventeen carbons. Thus, tall oil fatty acids are preferred and aside from conjugated and unconjugated linoleic acid, suitable acids may include, for example, oleic and elaidic acids.

Preferably, the fatty acid is di- or poly-unsaturated and the reaction between the maleic anhydride and unsaturated fatty acid may involve the conversion of double bonds to a cyclic structure and so may be a cyclo-addition of a Diels-Alder type, particularly in the case in which the double bonds in fatty acid are conjugated. Thus, the resulting adduct may be of the formula

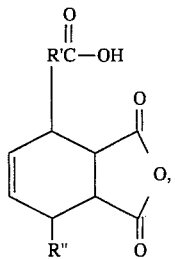

wherein R' is a generally linear organic moiety of from about two to about 20 carbon atoms and R" is hydrogen or a generally linear organic moiety of up to about 20 carbon atoms, the total number of carbon atoms in R' and R" being from about 10 to about 20 carbon atoms. However, while reaction of the traditional Diels-Alder type is preferred, the cyclo-addition reaction need not be of such type in that it does not require that the cyclic structure formed be six membered ring or that the unsaturated fatty acid be conjugated. It is believed that "endo", "ene" or other cyclo-addition reactions would yield suitable products.

Alternatively, the reaction may be a simple addition reaction, especially in those situations in which the fatty acid is mono-unsaturated. In a typical reaction between maleic anhydride and a mono-unsaturated fatty acid, the addition occurs at the carbon atom next to one which is double bonded to give compounds such as

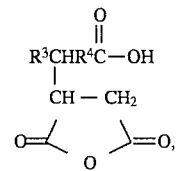

wherein $R^3$ is an alkyl or alkenyl group of from about two to about fifteen carbons and $R^4$ is an alkylene or alkenylene group of from about two to about fifteen carbons.

The resulting product, therefore, is mono-, di- or polycyclic, with one of the cyclic structures being the maleic anhydride moiety and another cyclic structure resulting from the reaction at the carbon-carbon double bond of the maleic anhydride reactant. The latter cyclic structure preferably includes at least one pendent chain that is a residue from the fatty acid. The chain terminates with a carboxyl group and may be represented by the formula $-R'C(:O)OH$, wherein R' is a generally linear organic moiety, preferably an alkylene or an alkenylene, especially of from about five to about ten carbons. Optimally, R' is an alkylene.

The latter cyclic structure may also include another pendent chain that is a residue from the fatty acid. That chain is likewise a generally linear organic moiety. Preferably, it is an alkyl or alkenyl, especially alkyl, group of, for example, from one to about ten carbons. In other words, if the fatty acid is conjugated such that it may be represented as $R"CH:CHCH:CHR'C(:O)OH$, wherein R' is as described above and R" is an alkyl or alkenyl, especially alkyl, group such that the total carbons of the acid is from about 14 to about 22 (preferably, about 16 to about 18), the resulting adduct may be represented as

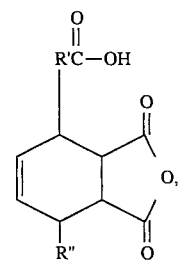

as noted above.

The fatty acid maleic anhydride adduct is then reacted with an alcohol. Thus, the adduct is reacted with a composition of the form ROH, wherein R is an organic moiety. Generally, the reaction is carried out under ambient conditions, preferably with an excess of alcohol. Preferred organic moieties include alkyl, aryl, aralkyl, alkaryl or amine groups. The composition ROH may be an ethoxylated alcohol or a phenol. The reaction is an esterification reaction that takes place at the anhydride moiety, converting the anhydride segment

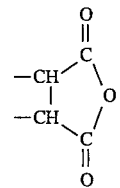

to the form

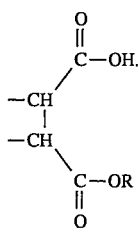

The reaction product therefore includes at least three carboxyl groups.

Thus, where R, R', R", $R^3$ and $R^4$ are defined as above, reaction of ROH with an adduct of the formula

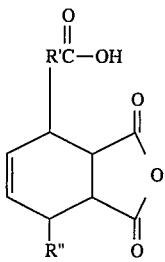

yields a compound of the formula

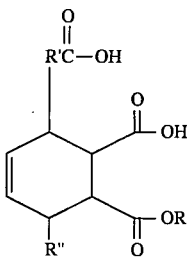

or the formula

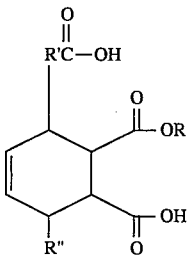

or a mixture thereof. Reaction of an adduct of the formula

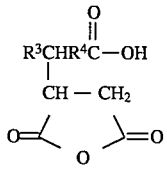

yields a compound of the formula

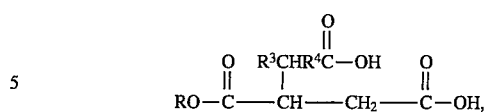

the formula

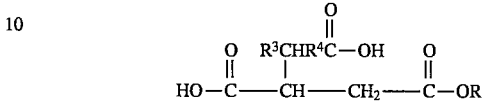

or a mixture thereof.

The reaction products are thus dicarboxylic esters and are then in turn reacted with an ethoxylated amine (or combination of ethoxylated amines), such as of the formula $R^5N[(CH_2CH_2O)_nH]_2$, wherein $R^5$ is a fatty organic group (preferably a fatty alkyl group of from about six to about thirty carbon atoms, more preferably about twelve to about eighteen carbon atoms) and n is an integer from one to about fifty, preferably about nine to about fifteen. The reaction is slightly exothermic, proceeding readily to completion under ambient conditions upon simply mixing the reactants together. The degree of ethoxylation depends on the desired degree of water solubility/oil solubility desired (the greater the degree of water solubility desired, the greater the degree of ethoxylation), which in turn depends on the water and oil content of the fluid in which the surface to be treated is located. Thus, this additive and the method provide a simple mechanism for customization of the additive to the fluid. Often produced fluids may have a water content on the order of 50% to 70%, rendering significant water solubility desirable. It is desired to treat the surface by addition of the additive to the fluid itself. Accordingly, it is desired that the additive be soluble in the fluid. By "soluble" in this context, what is meant therefore is that the additive be at least dispersible in the fluid at the desired concentration of additive as discussed below.

According to the preferred method, the metal surface should bear a film of ferrous ions for formation of an iron carboxylate coating by reaction of the ferrous ions with the inhibitor. However, the inhibitor may be injected into the fluid before the development of the film of ferrous ions, and then as the metal surface corrodes, the ferrous ions form, providing the film for adherence thereto of the inhibitor. The film may be heavily peppered and need not be uniform or continuous. A simple means for applying the film on a ferrous metal surface in a corrosive medium (i.e., a medium in which the surface tends to corrode) is to allow the surface to sit in the medium for a short time so that a limited degree of corrosion forms a film on the surface. Then the inhibitor may be added to the fluid. The inhibitor then reacts with the iron ions on the metal surface, forming an iron carboxylate and halting the corrosion.

The ability to add the inhibitor to the liquid in which the surface is located avoids the need to disrupt the system either to remove the metal surface from the liquid or to reach the metal surface with mechanical application means for application of the film. The inhibitor may be simply added to the liquid, even if the liquid is involved in a continuous flow operation. And despite the solubility that permits this advantage, the film remains tenaciously adherent and does not dissolve back into the liquid, even when the surface is exposed to fresh, inhibitor-free liquid, as may occur, for example, in open systems. Accordingly, continuous addition or repeated reapplication of inhibitor is unneeded. The amount of inhibitor needed to afford and to maintain corrosion inhibition therefore may be reduced dramatically by this method.

In an alternative method, if the maleated unsaturated fatty acid is sufficiently dispersible in the fluid, it and the ethoxylated amine may be added individually to the fluid such that they react together in the fluid. Accordingly, the reaction product is incorporated in the medium, preferably by addition thereto, but also less preferably by formation therein. In yet another embodiment of the invention, direct application to the surface as discussed with respect to the inhibitor of U.S. Pat. No. 5,385,616 is still available as an option.

In any of these methods, the inhibitor may be incorporated into a carrier such as a solvent; for example, methanol, kerosene or crude oil. In such case, the solubility of the inhibitor may be coordinated not only with the liquid that contains the metal surface, but with the carrier as well. Demulsifiers and other adjuvants may be included as desired. For example, a typical formulation might comprise 40% by weight reaction product, 5% by weight alcohol such as isopropyl alcohol in the case in which the surface is in a water-rich medium, and 55% organic solvent such as xylene. Another formulation might comprise a 10 or 11% or even a 25% by weight solution of inhibitor in methanol or crude oil. A demulsifier may be added to this formulation if desired.

Upon incorporation of the ethoxylated amine/dicarboxylic ester reaction product to a liquid containing a metal surface bearing ferrous ions (typically in the form of iron sulfide in the case of sulfide-type corrosion or iron carbonate in the case of carbon dioxide corrosion), such as a corroding iron or steel surface, an iron carboxylate complex is formed between the ethoxylated amine/dicarboxylic ester reaction product and the ferrous ions on the metal surface. In particular, the complex is believed to result from the electrostatic attraction between the negative charge at the double-bonded oxygens of the multiple carboxyl groups and the positively charged ferrous ions on the metal surface. Thus, superior film formation results from at least slight pre-corrosion of a ferrous metal surface before introduction of the amine/ester reaction product or at least before deposition on the surface. It is preferred that the surface include a film or coating of the ferrous composition thereby to provide a substrate for a continuous and complete inhibitor coating.

It also has been found that surprisingly small amounts of the inhibitor affords substantial corrosion inhibition. In fact, it has been discovered that inhibitor concentrations above a certain level are accompanied by decreased efficacy. As a result, although any concentration equal to or above about 25 ppm by weight may be used, preferably the concentration should not exceed about 1,000 ppm by weight. In fact, while corrosion inhibition efficacy improvement has been found as the inhibitor concentration increases from 25 to 50 to 100 ppm by weight, corrosion inhibition efficacy reduction has been noticed as concentrations exceed 250 ppm by weight. In view of these results, the preferred concentration range is from about 25 to about 1,000 ppm by weight, more preferably from about 50 to about 500 ppm by weight. Ideally, the concentration range should be from about 50 to about 100 ppm by weight. All of these concentrations are for the active amine/ester reaction product and are based on the weight of the liquid into which the product is to be incorporated.

The method of this invention provides a simple mechanism for customizing the corrosion inhibitor film to the system, thereby allowing optimization of film persistence in the particular system. By selecting an alcohol with an appropriate R group and an appropriate ethoxylated amine of desired degree of ethoxylation, the solubility of the inhibitor in the liquid containing the surface (as well as in the inhibitor carrier) can be selected.

The technique of this invention has been found to be particularly effective against carbon dioxide corrosion. It is believed that such superior efficacy is associated with protection against sulfide corrosion as well. The film, as noted, may be customized for the particular medium for improved persistence and resistance to shear forces induced, for example, by flow or movement of the medium across the surface.

The following examples describe preferred embodiments of the invention. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples. In the examples, all percentages are given on a weight basis unless otherwise indicated.

EXAMPLE 1

A rotating cylinder electrode test was carried out in three distinct phases in a water and oil mixture. In the first phase, an iron coupon was allowed to pre-corrode for 1.5 hours, during which the rate was monitored by electrochemical readings and iron counts. The corrosion rate during this period was measured as about 200 to about 300 mpy (mils per year). In the next phase, inhibitor was added and the monitoring continued for 22–23 more hours while an independent solution identical to the test solution was sparged with carbon dioxide without inhibitor present. At the end of the second phase, about 24 hours after initiation of the test, the test solution was removed and replaced with the uninhibited pre-sparged solution and monitoring was continued. During this latter period, inhibition was by only the inhibitor film on the coupon and differences between performance of inhibitors were observed. The test was run on a phosphate-based commercial inhibitor, on an inhibitor A within the scope of this invention (the reaction product of $RN[(EtO)_nH]_2$ and $R'CH[CH(COOR'')(CH_2COOH)](CH_2)_pCOOH$, wherein R is $C_{18}$, R' is $C_8$, R'' is $-CH(CH_3)_2$, n is 5 and p is 8), and an inhibitor B within the scope of this invention (the reaction product of $RN[(EtO)_nH]_2$ and $R'CH[CH(COOR'')(CH_2COOH)](CH_2)_pCOOH$, wherein R is $C_{18}$, R' is $C_8$, R'' is $-CH(CH_3)_2$, n is 5 and p is 8). The inhibitor concentration in each case was 100 ppm active.

At the end of the pre-corrode period, the iron count was about 2–3 mg/L, equivalent to about 200–300 mpy, for each of the three inhibitors. After addition of the inhibitor, the iron count leveled out for each run and corrosion was under control for the 22–23 hour period of the second phase for each inhibitor. At the end of the 22–23 hour period, the inhibited fluids were replaced with the identical but inhibitor-free fluids and a dip in the iron count was noted in each case due to the absence of iron ions in the fresh fluids. At this point, the corrosion rate for the fluid formerly containing commercial inhibitor shot up to a level expected for unihibited corrosion, with the fluid exceeding 10 mg/L iron within seven hours of phase three and reaching 40 mg/L within 24 hours. By contrast, the inhibitors A and B maintained corrosion inhibition over the entire sixty hours of phase three, with the iron content of the fluid never reaching 10 mg/L for inhibitor A and never reaching even 5 mg/L for inhibitor B.

Analysis of the coupon surface by FTIR verified that the inhibitors A and B built up a corrosion product layer.

EXAMPLE 2

The procedure of Example 1, above, was carried out with various concentrations of inhibitors A and B; namely, 0 ppm (blank), 25 ppm, 50 ppm, 100 ppm, 250 ppm, 500 ppm, and 1000 ppm. It was found that corrosion inhibition (particularly in the phase three when the fluid no longer contains inhibitor) improved as the concentration increased from 25 to 50 to 100 ppm. However, as the concentration exceeded 250 ppm, corrosion inhibition (while remaining very good while inhibitor was present in the solution) decreased markedly when the fluid was replaced with inhibitor-free fluid, indicating a loss of film or film persistency.

In view of the above, it will be seen that the several advantages of the invention are achieved and other advantageous results attained.

As various changes could be made in the above methods and compositions without departing from the scope of the invention, it is intended that all matter contained in the above description shall be interpreted as illustrative and not in a limiting sense.

What is claimed is:

1. A method for inhibiting corrosion of a metal surface in a liquid containing water and hydrocarbon, the metal surface being susceptible to formation of ferrous ions upon corrosion, the method comprising incorporating into the liquid an amount of a corrosion inhibitor sufficient to inhibit corrosion, the corrosion inhibitor comprising the reaction product of an ethoxylated amine and a dicarboxylic ester selected from the group consisting of

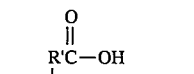

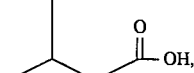

and

-continued

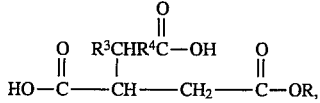

wherein R is hydrogen or an alkyl, aryl, aralkyl or alkaryl group of from about one to about twenty carbons, R' is a linear organic moiety of from about two to about 20 carbon atoms and R" is hydrogen or a linear organic moiety of up to about 20 carbon atoms, the total number of carbon atoms in R' and R" being from about 10 to about 20 carbon atoms, $R^3$ is an alkyl or alkenyl group of from about two to about fifteen carbons and $R^4$ is an alkylene or alkenylene group of from about two to about fifteen carbons.

2. A method as set forth in claim 1 wherein ferrous ions form on the metal surface and the corrosion inhibitor reacts with the ferrous ions to form an iron carboxylate on the metal surface.

3. A method as set forth in claim 1 wherein the metal surface bears a corrosion product including ferrous ions when the corrosion inhibitor is incorporated into the liquid.

4. A method as set forth in claim 2 wherein the ethoxylated amine is ethoxylated to a degree such that the reaction product is soluble in the liquid at least to the extent of the amount of corrosion inhibitor applied to the liquid.

5. A method as set forth in claim 3 wherein the ethoxylated amine is ethoxylated to a degree such that the reaction product is at least dispersible in the liquid at the amount the corrosion inhibitor is incorporated into the liquid.

6. A method as set forth in claim 5 wherein the amount is from about 25 to about 1,000 ppm by weight active corrosion inhibitor based on the weight of the liquid.

7. A method as set forth in claim 6 wherein the corrosion inhibitor is added to the liquid and the liquid contains at least about 50% by weight water.

8. A method as set forth in claim 1 wherein the ethoxylated amine corresponds to the formula $R^5N[(CH_2CH_2O)_nH]_2$, wherein $R^5$ is a fatty organic group and n is an integer of from one to about fifty.

9. A method as set forth in claim 8 wherein $R^5$ is a fatty alkyl group of from about six to about thirty carbon atoms.

10. A method as set forth in claim 9 wherein n is an integer of from about nine to about fifteen.

11. A method as set forth in claim 10 wherein $R^5$ is a fatty alkyl group of from about twelve to about eighteen carbon atoms.

12. A method as set forth in claim 1 wherein the liquid is produced water and oil.

13. A method for inhibiting corrosion of a metal surface in a liquid containing water and hydrocarbon, the metal surface being susceptible to formation of ferrous ions upon corrosion, the method comprising incorporating into the liquid a corrosion inhibitive amount of a salt of an ethoxylated amine and a reaction product of an alcohol and a fatty acid maleic anhydride adduct selected from the group consisting of

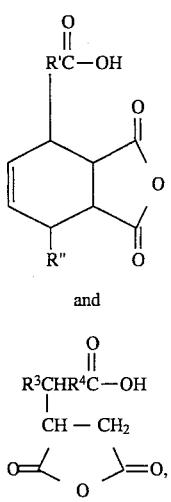

and wherein R' is a linear organic moiety of from about two to about 20 carbon atoms and R" is hydrogen or a linear organic moiety of up to about 20 carbon atoms, the total number of carbon atoms in R' and R" being from about 10 to about 20 carbon atoms.

14. A method as set forth in claim 13 wherein the alcohol is of the form ROH wherein R represents an alkyl, an aryl or an arylalkyl group of from about 1 to about 30 carbons.

15. A method as set forth in claim 14 wherein R represents an alkyl, an aryl or an arylalkyl group of from about 1 to about 10 carbons.

16. A method as set forth in claim 15 wherein R represents an isopropyl group.

17. A method as set forth in claim 13 wherein the ethoxylated amine corresponds to the formula $R^5N[(CH_2CH_2O)_nH]_2$, wherein $R^5$ is a fatty organic group and n is an integer of from one to about fifty.

18. A method as set forth in claim 17 wherein $R^5$ is a fatty alkyl group of from about six to about thirty carbon atoms.

19. A method as set forth in claim 18 wherein n is an integer of from about nine to about fifteen.

20. A method as set forth in claim 19 wherein $R^5$ is a fatty alkyl group of from about twelve to about eighteen carbon atoms.

21. A method as set forth in claim 16 wherein the fatty acid maleic anhydride was produced by a reaction between maleic anhydride and conjugated linoleic acid.

22. A method as set forth in claim 13 wherein the liquid is produced water and oil.

23. A method as set forth in claim 13 wherein the amount of corrosion inhibitor incorporated into the liquid is from about 25 to about 1,000 ppm by weight active corrosion inhibitor based on the weight of the liquid.

* * * * *